No. 700,447. Patented May 20, 1902.
G. W. SMITH.
PICTURE PROJECTING APPARATUS.
(Application filed June 20, 1898.)
(No Model.) 3 Sheets—Sheet 1.
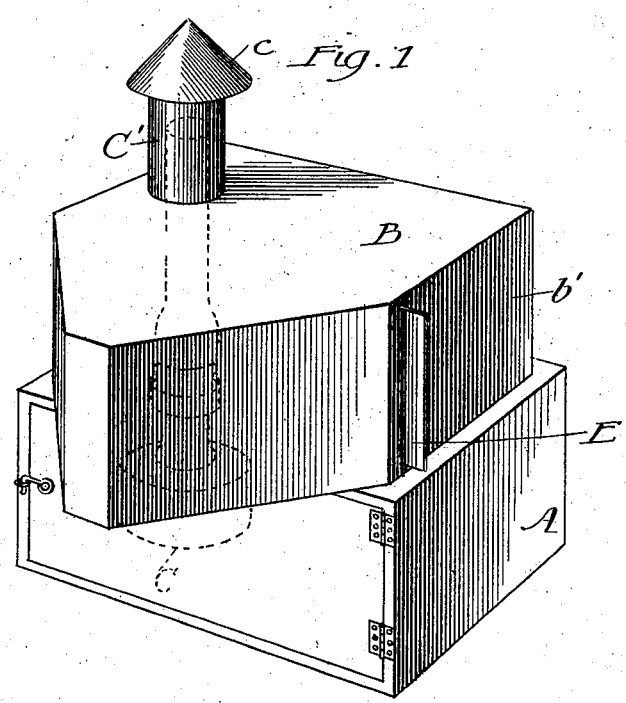

No. 700,447. Patented May 20, 1902.
G. W. SMITH.
PICTURE PROJECTING APPARATUS.
(Application filed June 20, 1898.)
(No Model.) 3 Sheets—Sheet 2.
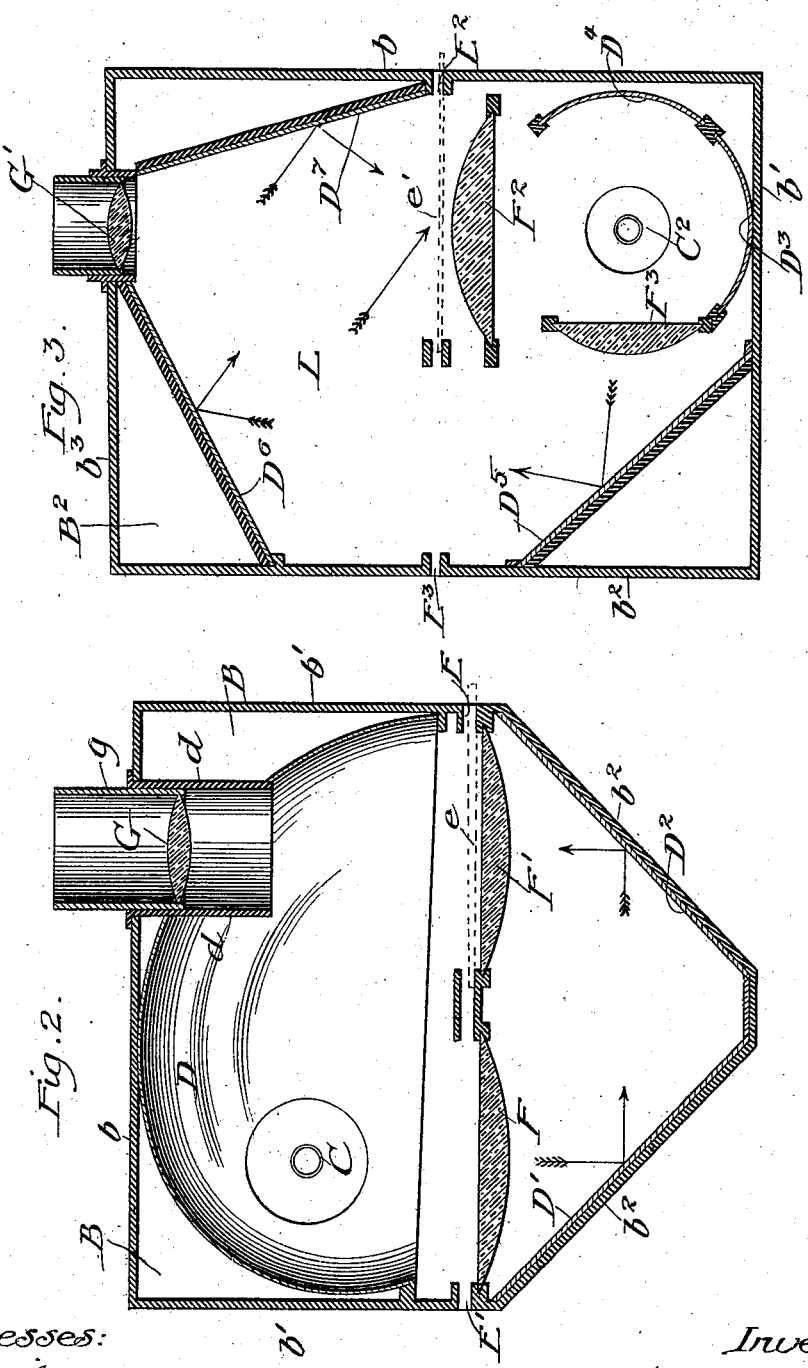
Witnesses:
Frank S. Blanchard
Inventor:
George W. Smith
By Attorneys No. 700,447. Patented May 20, 1902.
G. W. SMITH.
PICTURE PROJECTING APPARATUS.
(Application filed June 20, 1898.)
(No Model.) 3 Sheets—Sheet 3.
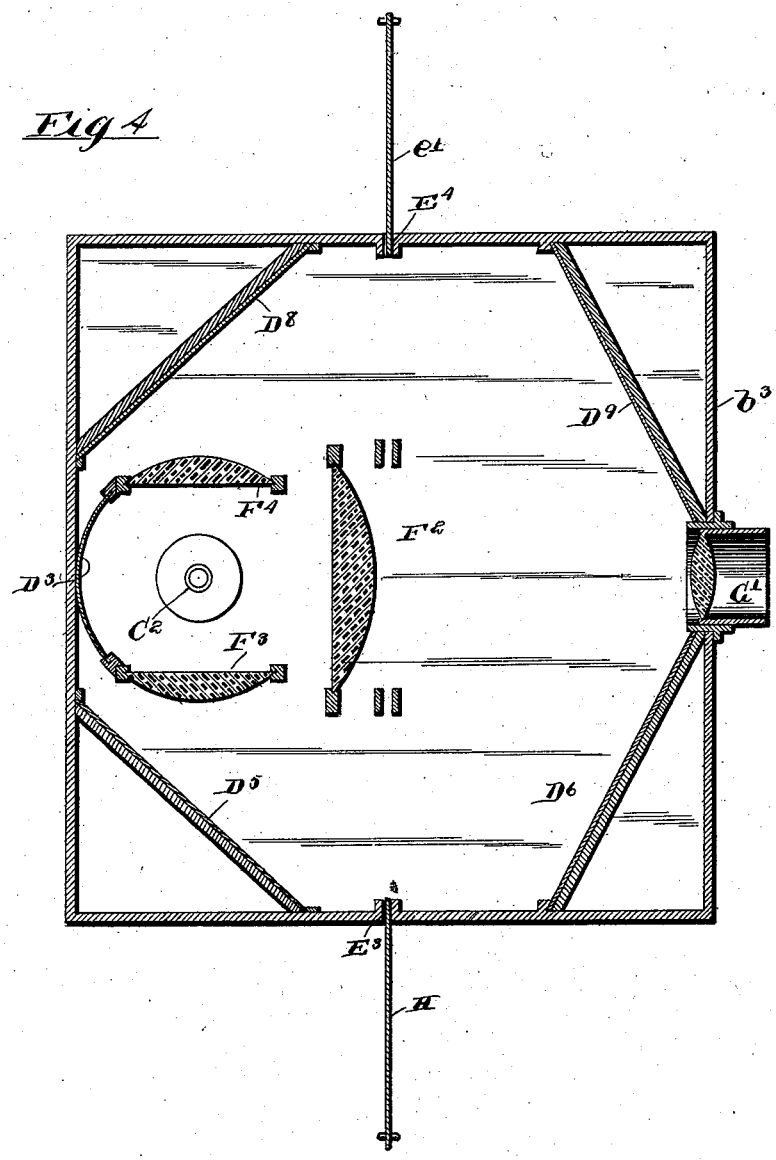
Witnesses:-
Carl A. Crawford
William W. Hall
Inventor:-
George Watson Smith
by Poole & Brown
his Attorneys

UNITED STATES PATENT OFFICE.

GEORGE WATSON SMITH, OF EVANSTON, ILLINOIS.

PICTURE-PROJECTING APPARATUS.

SPECIFICATION forming part of Letters Patent No. 700,447, dated May 20, 1902.

Application filed June 20, 1898. Serial No. 683,987. (No model.)

*To all whom it may concern:*

Be it known that I, GEORGE WATSON SMITH, of Evanston, in the county of Cook and State of Illinois, have invented certain new and useful Improvements in Picture-Projecting Apparatus; and I do hereby declare that the following is a full, clear, and exact description thereof, reference being had to the accompanying drawings, and to the letters of reference marked thereon, which form a part of this specification.

This invention relates to certain new and useful improvements in optical projecting apparatus whereby transparent or opaque pictures or pictures partly transparent and partly opaque or translucent or, in fact, a transparent picture or any kind of object or body or picture may be interchangeably projected without necessitating any change in the adjustment of the apparatus.

Heretofore magic lanterns have been devised to project transparent pictures only or opaque pictures or objects only, or they have been provided with an attachment to the transparency-projector whereby the same may be converted into a projector for opaque pictures. In the use of the said attachment, however, the adjustment necessary to effect the change from one class of picture to the other is such that it is not practical to show them interchangeably. All the aforesaid results are accomplished with my improvements without any change or adjustment of the apparatus whatsoever.

In addition to the general features above referred to the invention also embraces other improved features of construction of projectors, as will be hereinafter more fully set forth.

The invention may be more readily understood by reference to the accompanying drawings, in which—

Figure 1 is a perspective view of a device embodying one form of my invention. Fig. 2 is a horizontal sectional view of Fig. 1. Fig. 3 is a sectional view illustrating a modified form of my invention. Fig. 4 is a sectional view illustrating a modification of the construction shown in Fig. 3.

As shown in Figs. 1 and 2, A indicates a box designed to support a lantern-box B and contain the lower part or oil-receptacle of a lamp C. The lantern-box B is constructed with similar horizontal parallel bottom and top walls, resembling in shape a trapezoid, the non-parallel sides of which are equal, joined at its longer base with the longer side of a rectangle and equal to the same in length. The vertical walls of the said box consist of a front wall $b$, end walls $b'$ $b'$, which are at right angles with the front wall, and rear walls $b^2$ $b^2$, which are arranged obliquely with respect to the front and end walls. The longer or front wall $b$ of the said box is provided with an object-lens G, mounted in a tube $g$, which is not shown in Fig. 1. The end wall $b'$ nearer to the said objective lens is provided near its rear margin with a vertical slot or slide-aperture E. The rear end of the said box constitutes a reflecting-chamber, hereinafter described. A pipe or funnel C' is attached to the top of the box B and the same being provided with a cap $c$ and being designed to provide means for the escape of heat.

As shown in the horizontal sectional view, Fig. 2, the rectangular portion of the box B, formed by the front and end walls thereof, contains an ellipsoidal reflector D, of silvered glass or other suitable material, at one focus of which is located the lamp C, said reflector having an opening $d$ to receive the objective tube $g$, containing the objective lens G. The said lens is located opposite a slide-carrier E, which is adapted to receive a slide $e$. The said reflector is placed in the said box with its central axis oblique to the slide-carrier, so that the light of the lamp C is directed obliquely toward said slide-carrier and is concentrated upon the front of the picture or slide placed therein. The rear portion of said box constitutes a reflection-chamber having the reflectors D' D², which, as herein shown, are plain reflectors of silvered glass. It is to be understood, however, that reflectors of any kind or materials may be used. Said reflectors are secured against the oblique rear walls $b^2$ $b^2$ and are placed at an angle of forty-five degrees with respect to the optical axis of the objective lens and with the slide-carrier E. Between the reflecting-chamber and the rectangular body of the lantern-box are located, side by side and parallel with the front wall of the box, two condensing-lenses or condensers F F'. One, F, of said condensers is placed between the lamp or source of light C and the reflector D' and the other, F', between the reflector $D^2$ and the slide-carrier E in the optical axis of the objective lens. As shown, said condensers are plano-convex lenses having their plane faces adjacent to the rectangular box. By this construction a large part of the light from said lamp will be concentrated upon the back of the said slide $e$, the same passing through the condenser F to the reflector D', being reflected therefrom to the reflector $D^2$ and being a second time reflected or thrown through the condenser F' and thence through the slide $e$ and the object-lens of the lantern. An image is projected by the passage of the light through the slide $e$ when the latter contains or consists of a transparent picture in the manner common to the sciopticon or magic lantern adapted to project by the use of transparent slides.

It is obvious that with transparent slides the instrument will operate in the same manner as usually does a lantern for projection from transparencies and that with opaque slides the instrument will operate as effectively as any other instrument operating by reflection from a slide or object. It is equally clear that with a slide partly opaque and partly transparent or translucent my invention will operate simultaneously as a megascope and sciopticon combined, thus without any change producing dioramic results not heretofore possible or attainable except at great expense. For this reason my invention is of great scientific value, as it is possible thereby to project perfectly sections of plants, minerals, anatomical specimens, and many others. It is the more useful for scientific purposes, for the reason that the same slide or object may be projected by reflected light alone, or by transmitted light alone, or by both simultaneously, without removing the slide or changing the adjustment of the projector.

In the modification illustrated in Fig. 3 a rectangular box $B^2$ is provided with an objective G', located to the right of the center of the front wall $b^3$ thereof. The slide-carriers $E^2$ $E^3$, with their slides, form a transverse partition midway in said box, the slide-carrier $E^2$ being opposite to the objective G'. A concave reflector $D^3$ is secured to the rear wall of said box in a position to reflect the light from a lamp $C^2$, located at or near centers of curvature of the mirrors, upon the condenser $F^2$, placed between the slide $e'$ and the said lamp in close proximity to the said slide and in a plane parallel to the front wall of the box. As will be seen by reference to said Fig. 3, the objective, slide, condenser, lamp, and reflector are in linear arrangement in the order named, occupying the right half of the lantern-box, adapted to operate as a sciopticon, projecting by means of transparent slides. To the right of said lamp $C^2$ is placed a concave mirror or reflector $D^4$, of silvered glass or other suitable material, in such position as to reflect the side light of the said lamp upon a plano-convex condenser $F^3$, placed to the left of the said lamp, its plane side adjacent thereto and adapted to concentrate the side light from said source of light or lamp upon the plane reflector $D^5$, placed at such angle (about forty-five degrees) with the rear wall of said box that the light from the said condenser falling thereon will be reflected to the reflector $D^6$, which extends across the left front corner of said lantern-box and at such an angle with the said reflector $D^5$ and the slide $e'$ that all light falling upon the reflector $D^6$ from the reflector $D^5$ will be reflected upon the front of said slide, thereby illuminating the said slide and from the opaque portions thereof causing an image by reflection to be projected in a manner common to magic lanterns projecting from opaque slides. The plane reflector $D^7$ is placed across the upper right corner, extending from the objective case to the slide-carrier $E^2$ in such angular relation to the slide and the reflector $D^6$ that any light reflected from said reflector $D^6$ upon the reflector $D^7$ will be reflected back upon the slide.

It will be observed that the left side of Fig. 3 is, in effect, a reflection-chamber, having functions similar to the same element illustrated in Fig. 2, but reversed. Here the reflected light projects the image from the opaque picture on the front of the slide, whereas in the form illustrated in Fig. 2 the reflected light projected an image in a manner common to instruments projecting by means of transparent slides. This form of construction has many and great advantages, a few of which are that while the reflector $D^6$ is adapted to illuminate the top and left side of an object—as, for example, a geological or other specimen—the reflector $D^7$ is so placed as to illuminate the top and also the right side of the body placed on said slide, thus projecting from such bodies more perfectly than any other optical projector and greatly increasing its utility for scientific purposes. As a modification of this form and for the purpose of increasing the said effect of my projector, Fig. 4 illustrates a construction in which the box $B^2$ is made wider by the addition on the right of a reflector-chamber similar to that on the left, thus making the projector as respects the said reflection-chambers on the right and left sides thereof symmetrical, the concave reflector $D^4$ being replaced by a condenser $F^4$, similar to $F^3$, and in like relation to the source of light. A plane reflector $D^8$, corresponding to the reflector $D^5$, is located across the rear right corner, and a reflector $D^9$ is arranged at an angle with the axis of the objective equal to the angle therewith formed by the reflector $D^6$, and a slide-carrier $E^4$, corresponding to slide-carrier $E^3$, is arranged in the reflection-chamber on the right. Inasmuch as the two sides of the projector are symmetrical, it is obvious that they will operate with like effect on the top and the left and the right sides, respectively, thereby illuminating the front of the slide $e'$ or an object placed thereon from both sides equally, thus better projecting images from an opaque slide or an object placed on said slide. There is also considerable advantage derived from having the slide-holders on the right and left of the slide-holder $E^2$, inasmuch as by inserting colored transparent slides in said slide-holders light and color and other dioramic effects are produced not obtainable in any other projector projecting by means of opaque or partly opaque slides. The like effects are produced also in the like manner when projecting by means of a transparent slide. It is obvious also that the instrument is more valuable for all purposes, and especially for demonstration or scientific purposes, in that images of the same object or slide may be projected by reflected light alone, or by transmitted light alone, or by both simultaneously, without removing the slide or changing the adjustment of the projector.

As may be clearly seen by reference to Figs. 3 and 4, if a shutter such as is indicated by H in Fig. 4 be introduced into the slide-carrier $E^3$ the instrument operates as an ordinary sciopticon. If the shutter be introduced behind the slide $e'$ in $E^2$, the megascope effect is obtained, while if the shutter be not used it is evident that the image produced will be the result of a simultaneous projection of a reflected image and an image by transmitted light heretofore explained.

Any source of light and lenses and reflectors of any shape and material may be used.

I claim as my invention—

1. An optical projecting apparatus, embracing an inclosure, a slide-holder therein, said inclosure being provided with a space or passage outside of the slide-holder to permit the passage of the light around the same, a condensing-lens in said passage or space, an object-lens, a source of light, and reflectors located both in advance and at the rear of the plane of said slide-holder, whereby light from said source of light may be thrown on both sides of a picture in said slide-holder.

2. An optical projecting apparatus, comprising an inclosure, a slide-holder therein, said inclosure being provided with a space or passage outside of the slide-holder, to permit the passage of the light around the same, a condensing-lens in said passage or space, an object-lens, a source of light, and reflectors located both in advance and at the rear of the plane of said slide-holders including one or more obliquely-arranged reflectors adapted to change the course of the rays of light, whereby light from said source of light may be thrown on both sides of a picture held in said holder.

3. An optical projecting apparatus, comprising an inclosure, a slide-holder therein, said inclosure being provided with a space or passage outside of the slide-holder, to permit the passage of light around the same, a condensing-lens in said passage or space, an object-lens, a source of light, reflectors located at the rear and in front of the plane of the slide-holder including one or more reflectors arranged obliquely to change the direction of the rays of light and a condensing lens or lenses interposed between the source of light and the said slide-holder.

4. An optical projecting apparatus comprising a slide-holder, an objective lens, a source of light located at one side of and in front of the slide-holder, a reflector to throw light upon the front face of an opaque picture in the slide-holder and two obliquely-arranged reflectors, one at the rear of the source of light and the other at the rear of the slide-holder, said latter reflector operating to throw light through a transparent picture in the said slide-holder.

5. An optical projecting apparatus comprising a slide-holder, an objective lens, a source of light located in front of and at one side of the slide-holder, a reflector located in position to throw light upon the front face of an opaque picture in the slide-holder, two condensing-lenses one at the rear of the source of light and the other at the rear of the slide-holder and two oblique reflectors located at the rear of said condensing-lenses, said oblique reflectors being constructed to throw light through a transparent picture in said slide-holder.

In testimony that I claim the foregoing as my invention I affix my signature, in presence of two witnesses this, 16th day of June, A. D. 1898.

GEORGE WATSON SMITH.

Witnesses:
WILLIAM L. HALL,
CHARLES W. HILLS.